(12) United States Patent
Bingel

(10) Patent No.: US 6,198,818 B1
(45) Date of Patent: Mar. 6, 2001

(54) METHOD AND APPARATUS FOR CONTROLLING THE INPUT IMPEDANCE OF AN ANALOG FRONT END CIRCUIT OF A DATA COMMUNICATIONS EQUIPMENT (DCE) DEVICE

(75) Inventor: Thomas Bingel, Belleair Beach, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/099,089

(22) Filed: Jun. 17, 1998

Related U.S. Application Data

(60) Provisional application No. 60/049,812, filed on Jun. 19, 1997.

(51) Int. Cl.[7] .............................. H04M 1/00; H04M 9/08
(52) U.S. Cl. ............................................. 379/399; 379/387
(58) Field of Search ................................... 379/399, 398, 379/413, 387, 394, 400, 401

(56) References Cited

U.S. PATENT DOCUMENTS

| | | | |
|---|---|---|---|
| 4,433,212 | * 2/1984 | Moses et al. | 379/29 |
| 4,652,703 | * 3/1987 | Lu et al. | 379/339 |
| 5,333,192 | 7/1994 | McGinn | 379/399 |
| 5,426,698 | * 6/1995 | Reymond | 379/399 |
| 5,655,010 | * 8/1997 | Bingel | 379/93.28 |
| 5,740,241 | * 4/1998 | Koenig et al. | 379/399 |
| 5,768,368 | * 6/1998 | Koenig et al. | 379/418 |
| 5,850,436 | * 12/1998 | Rosen et al. | 379/377 |
| 5,864,607 | * 1/1999 | Rosen et al. | 379/90.01 |
| 5,982,852 | * 11/1999 | Schwartz | 379/29 |

* cited by examiner

*Primary Examiner*—Richemond Dorvil
(74) *Attorney, Agent, or Firm*—Thomas, Kayden, Horstemeyer & Risley LLP

(57) ABSTRACT

The present invention provides a method and apparatus for use with an analog front end circuit of a DCE of a multipoint system for preventing an impedance null from being generated in the frequency bands being used by the DCE. A feedback circuit is employed with the analog front end circuit to force the input current of the analog front end circuit to zero, thus providing the analog front end circuit with a high input impedance, which prevents an impedance null from forming in the frequency bands being used by the DCE. In accordance with the preferred embodiment of the present invention, a sensing resistor is incorporated into the analog front end circuit of the DCE for sensing the input current of the analog front end circuit. A feedback circuit coupled to the sensing resistor detects the input current sensed by the sensing resistor and causes a power driver of the analog front end circuit to force the input current to zero, thus providing the analog front end circuit with a high input impedance that prevents an impedance null from being created in the frequency bands being used by the DCE.

19 Claims, 5 Drawing Sheets

METHOD AND APPARATUS FOR CONTROLLING THE INPUT IMPEDANCE OF AN ANALOG FRONT END CIRCUIT OF A DATA COMMUNICATIONS EQUIPMENT (DCE) DEVICE

CROSS REFERENCE TO RELATED APPLICATIONS

This application claims priority to and the benefit of the filing date of a provisional application filed Jun. 17, 1997 entitled "Subscriber Line Impedance Control Method For Multidrop/Mutipoint DSL With Simultaneous POTS", having application Ser. No. 60/049,812, which is incorprated herein by reference in its entirety.

TECHNICAL FIELD OF THE INVENTION

The present invention relates to an analog front end circuit and, more particularly, to an analog front end circuit of a data communications equipment device (DCE) or other equipment for use in a multipoint environment wherein the analog front end circuit incorporates a feedback circuit that forces the input current of the analog front end circuit to zero, thereby generating a high input impedance and eliminating the impedance null that would otherwise occur in the frequency bands being used by the DCE or other equipment.

BACKGROUND OF THE INVENTION

Conventional communications systems typically include two DCEs connected across a communication connection, such as a subscriber loop associated with a public-switched-telephone-network (PSTN). The communication connection is comprised of a pair of copper wires that are terminated at the DCE so that the DCEs may communicate with each other via either half-duplex or full-duplex communications. These DCEs normally include a voltage driver that has a low source impedance for driving the data signal across the connection. Consequently, to effect multipoint communication, bridging additional voltage-driven devices to an end of the communications connection significantly loads the connection making it difficult to successfully communicate across the connection, As a result of the difficulty of bridging multiple voltage-driven DCE tributaries to the connection, in order to increase the number of DCEs at a particular location, prior art systems typically increase the number of communications connections such that each tributary at a customer premises is serviced by a separate communications connection. The insertion of additional connections into the system increases the overall cost of the system, particularly when the connection is a subscriber loop associated with a PSTN.

Recently, a multipoint system has been developed by the assignee of the present application that allows a plurality of tributaries to be bridged to a standard PSTN telephone twisted pair. The DCEs coupled to each of the tributaries communicate with a DCE located at the central office via a particular polling protocol. Each of the DCEs coupled to the tributaries comprises a current source-driven (i.e., driven by a high-impedance source) analog front end circuit that couples each DCE to its respective tributary via a dry transformer. In order to prevent the DCEs connected to the communications connection from pulling DC from the PSTN central office equipment, a DC blocking capacitor is inserted into the analog front end circuit of each DCE.

This DC blocking capacitor and the transformer of the analog front end circuit form an equivalent series RLC circuit. Multi-band communications over the multipoint system may include frequencies ranging from 15 Hz for the ring signal on the low end, from 200 Hz to 4000 Hz for voice-band modem communications and voice communications, and from approximately 20 KHz to 80 KHz at the upper end for data transmission. Practical values for the inductors of the transformer and for the DC blocking capacitor cause an impedance null to be created in or near the voice band with a low quality factor Q, usually resulting in a large band of attenuation in the voice band.

Accordingly, a need exists for a DCE that can be employed in a multipoint environment and which has an analog front end circuit designed to eliminate the impedance null that would otherwise occur in or near the voice band.

SUMMARY OF THE INVENTION

The present invention provides a method and apparatus for use with an analog front end circuit of a DCE or other equipment utilized in a multipoint system for preventing an impedance null from being generated in the frequency bands being used by the DCE or other equipment bridged to the multipoint system, such as, for example, a telephone. A feedback circuit is employed with the analog front end circuit to force the input current of the analog front end circuit to zero, thus providing the analog front end circuit with a high input impedance, which prevents an impedance null from forming in the frequency bands being used by the DCE or other equipment.

In accordance with the preferred embodiment of the present invention, the analog front end circuit of the present invention is utilized in equipment that is bridged to a twisted wire pair of a PSTN. The meaning of the term "DCE", as that term is used herein, is intended to encompass any and all types of equipment that may be bridged to a multipoint system, which preferably is a twisted wire pair of a PSTN. Therefore, in the interest of brevity, the analog front end circuit of the present invention will only be described in relation to its use in conjunction with a "DCE", since this term is intended to cover all types of equipment that can bu used in conjunction with the analog front end circuit of the present invention. It will be understood by those skilled in the art that the present invention is not limited to use with any particular type of equipment connected to the multipoint system. It will also be apparent to those skilled in te art that the present invention is not limited to use with a PSTN, but that the present invention can be used with any type of network.

In accordance with the preferred embodiment of the present invention, a sensing resistor is incorporated into the analog front end circuit of the DCE for sensing the input current of the analog front end circuit. A feedback circuit coupled to the sensing resistor detects the input current sensed by the sensing resistor and causes a power driver of the analog front end circuit to force the input current to zero, thus providing the analog front end circuit with a high input impedance that prevents an impedance null from being created in the frequency bands being used by the DCE.

These and other features and advantages of the present invention will become apparent from the following discussion, drawings and claims.

DETAILED DESCRIPTION OF THE INVENTION

Figure 1:
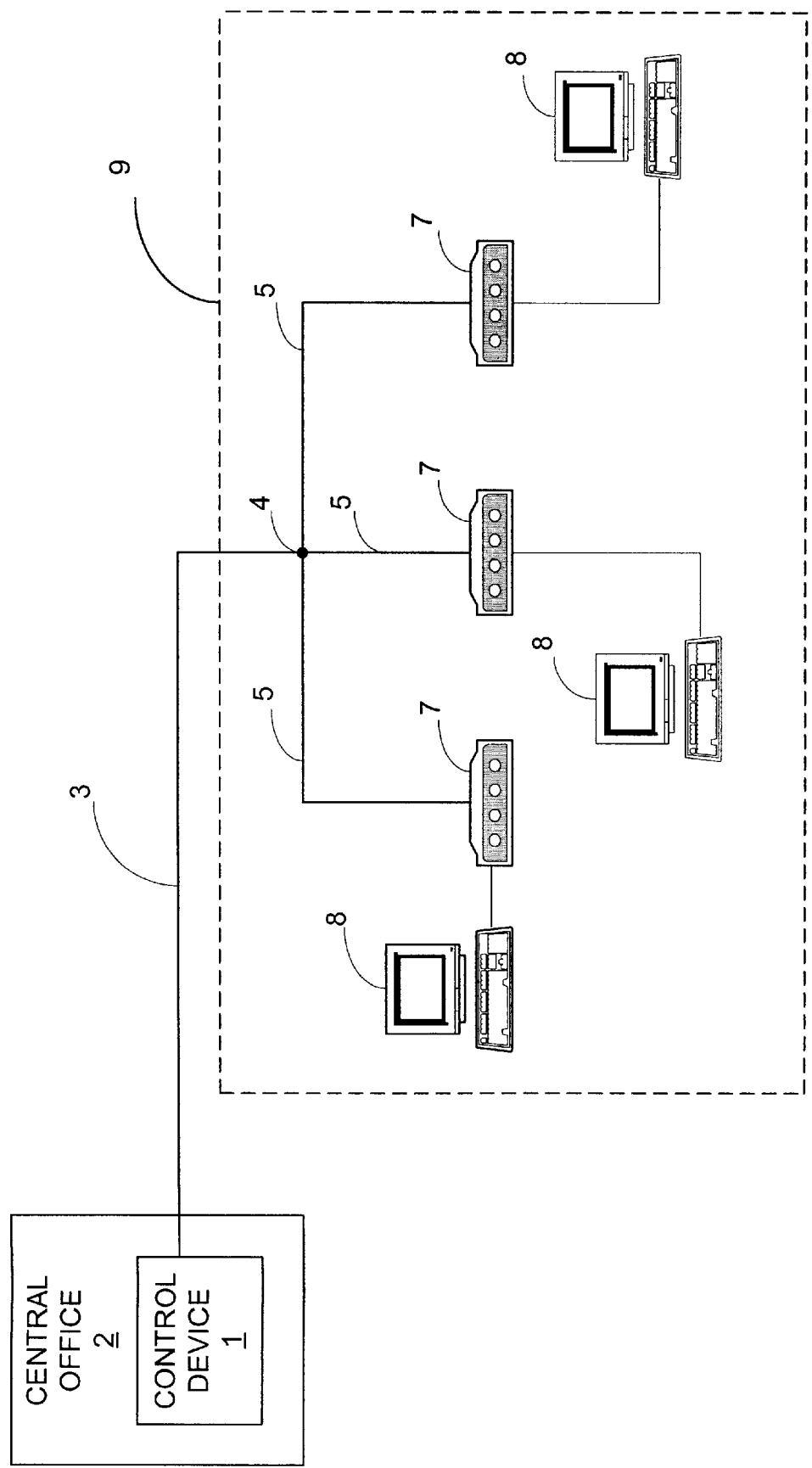
FIG. 1 is a block diagram illustrating a plurality of tributaries connected to a subscriber line in a miltipoint environment.

FIG. 1 is a block diagram functionally illustrating a multipoint communications circuit. FIG. 1 illustrates the connection between a bandwidth-management control device 1 of a facility 2 located at one end of the communications line 3, and data communication equipment 7 (DCE) and data terminal equipment (DTE) 8 located at the other end of the line 3 at another location 9. The control device 1 may be located at, for example, a central office of a telephone network and the DCEs 7 and the DTEs 8 may be located at a subscriber's premises. In this case, all of these devices 1 and 7 may be connected directly to the telephone system subscriber line, which would correspond to line 3 in FIG. 1. Multiple DCEs 7 may be directly connected to line 3, either within or externally to the location 9.

The DTEs 8 may be computers or any other type of terminal devices, including, for example, high-speed and low-speed devices. For the purposes of discussion, the DCEs 7 are sometimes referred to generally as modems. The DCEs 7 may be any type of data communications equipment, including, but not limited to, digital subscriber loop (DSL) modems. The combination of a DTE 8 and its respective DCE 7 is referred to herein as a "tributary". The tributaries bridged to the line 3 are designated by the numeral 5 in FIG. 1. The point in FIG. 1 designated by numeral 4 indicates that the tributaries 5 are all bridged to the line 3 at a single communications connection. However, it should be noted that the tributaries are not required to be connected to the line 3 at a single point, as will be understood by those skilled in the art.

Figure 2:
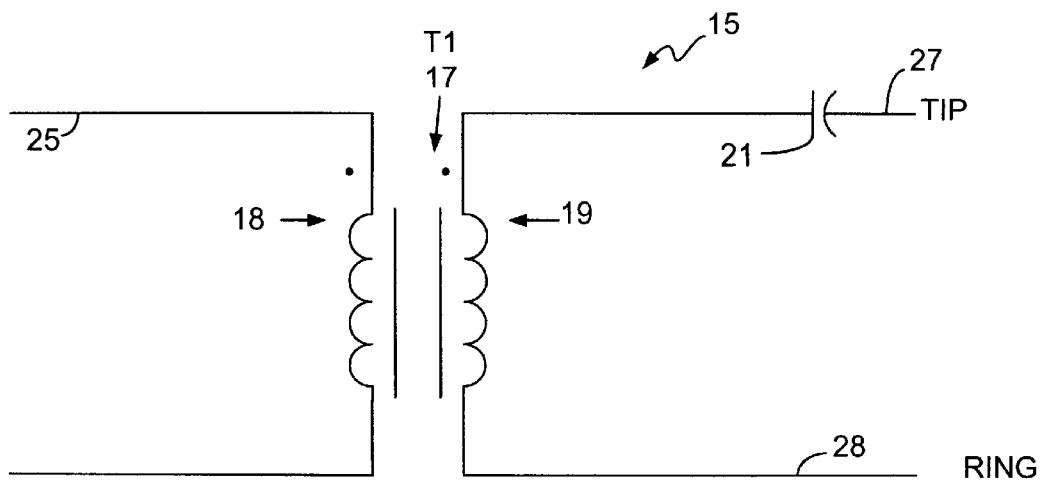
FIG. 2 is a schematic diagram of an anlog front end circuit having a transformer and a DC blocking capacitor that causes an impedance null to be created in the voice band.

In the multipoint system of FIG. 1, the control device 1 polls the DCEs 7 to control the outputting of data from the DTEs 8 via the DCEs 7 onto the line 3. Each of the DCEs 7 comprises an analog front end circuit. The line-coupling circuit 15 of the analog front end circuit of the DCE 7 is shown in FIG. 2. The line-coupling circuit 15 of the analog front end circuit includes a transformer 17 which comprises a modem side 18 and a line side 19. The transfomer 17 galvanically isolates the modem (not shown) from the line 3. The line side 19 of the transformer 17 of the line coupling circuit 15 comprises a DC blocking capacitor 21 which prevents direct current flow from the central office line card. Once the digital input from a DTE 8 to its associated DCE 7 has been converted by the associated DCE 7 into an analog signal by a digital-to-analog converter (not shown), the analog signal is input on line 25 to the line coupling circuit 15. The analog signal is then inductively coupled by the transformer 17 from the modem side 18 of the transformer into the line side 19 of the transformer 17. The analog signal is then capacitively coupled via DC blocking capacitor 21 onto the output lines 27 and 28 of the circuit, which are connected to the copper pair (not shown) comprised by the line 3.

Figure 3:
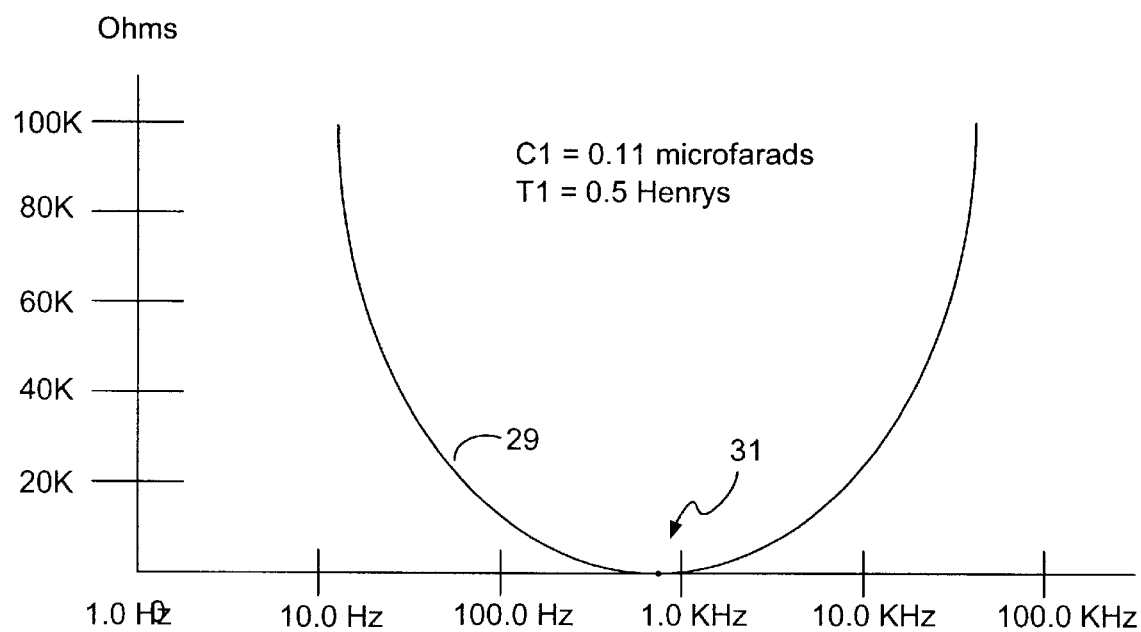
FIG. 3 is a graph illustrating input impedance as a function of frequency when a DC blocking capacitor having a value of 0.11 μF and a transformer with 0.5 H inductance are employed in the analog front end circuit of FIG. 2.
Figure 4:
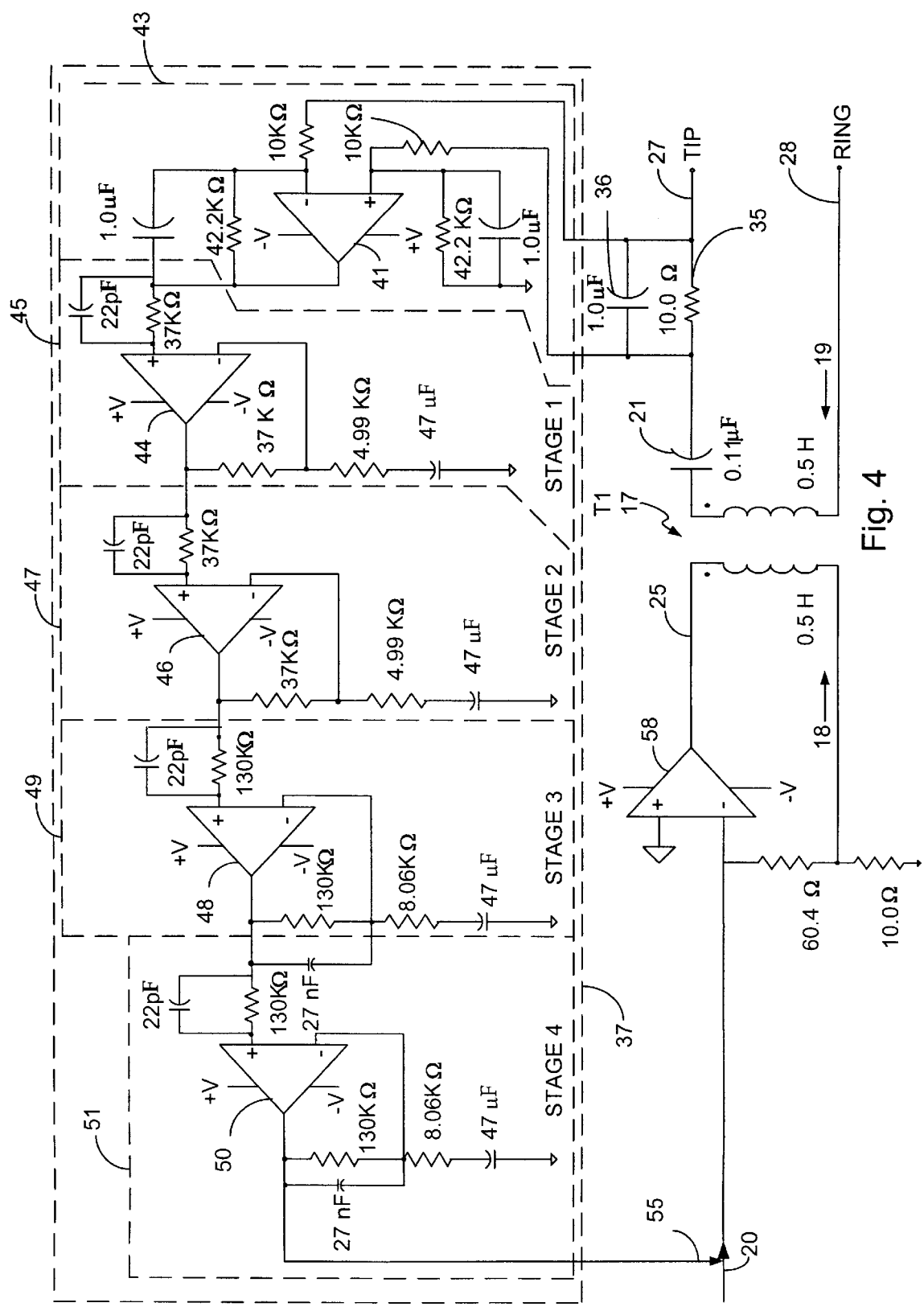
FIG. 4 is a schematic diagram of the analog front end circuit of the present invention in accordance with the preferred embodiment comprising a feedback circuit that generates a signal which is provided to the power driver of the DCE to cause the power driver to force the input current of the analog front end circuit to zero.

FIG. 3 is a graph illustrating the input impedance of the line coupling circuit 15 as a function of frequency when the method and apparatus of the present invention for maximizing the impedance of the analog front end circuit, which is discussed below with respect to FIG. 4, is not implemented with the analog front end circuit. As stated above, the use of the DC blocking capacitor 21 in conjunction with the transformer 17 creates a series resonant RLC circuit, which creates an impedance null in the frequencies being utilized by the analog front end circuit. As indicated in FIG. 3, a value of 0.11 μF for the DC blocking capacitor 21 results in an impedance null 31 at approximately 678 HZ, which is in the voice band. This impedance null 31 results in attenuation over a large range of frequencies. For the example illustrated by FIG. 3, the impedance is less than 600 Ω, which is a common impedance measure in the PSTN, over a frequency band of approximately 180 Hz centered at 678 Hz, and less than 10 KΩ over a frequency band of approximately 3000 Hz centered at 678 Hz. Although the null can be moved to frequencies below the voice frequency range, or above the voice frequency range but below the data frequency range, by altering the values of the transformer 17 and the capacitor 21, experimentation has demonstrated that it is undesirable to employ inductive and capacitive components having suitable values.

FIG. 4 illustrates a schematic diagram of the analog front end circuit of the present invention in accordance with the preferred embodiment. In accordance with the preferred embodiment, the analog front end circuit comprises a sensing resistor 35 coupled to a feedback circuit 37. The sensing resistor 35 senses the current on the line side 19 of the analog front end circuit 15. The capacitor 36 causes the feedback response to roll off. The amplification circuit 43 performs differential-to-single-ended conversion with gain. The 10 KΩ resistors connected to the inverting and noninverting terminals of amplifier 41 can be scaled up (i.e., increased in size) substantially or AC coupled with series capacitors to reduce leakage and provide isolation. Amplification circuit 43 provides an output to a cascade of amplifier stages, namely, "stage 1" 45, "stage 2" 47, "stage 3" 49, and "stage 4" 51. The output signal of the last stage 51 is output on line 55, which is connected to the inverting terminal "summing junction" of the power driver amplifier 58. The power driver amplifier 58 drives the line 3, which is connected to terminals 27 and 28, as discussed above with respect to FIG. 2. The power driver amplifier also receives at its inverting terminal an input signal on line 20 from the digital-to-analog converter (not shown) of the DCE 7, which corresponds to information to be output onto the line 3 via terminals 27 and 28 of the analog front end circuit.

It should be noted that the resistors connected to the noninverting terminals of stages 1, 2, 3 and 4 and the 22 pF capacitors in parallel with the resistors are not necessary to the overall operation of the analog front end circuit of the present invention. However, this configuration is preferred because the resistors improve the dc offset and the 22 pF capacitors in parallel with the resistors maintain the ac response.

Figure 5A:
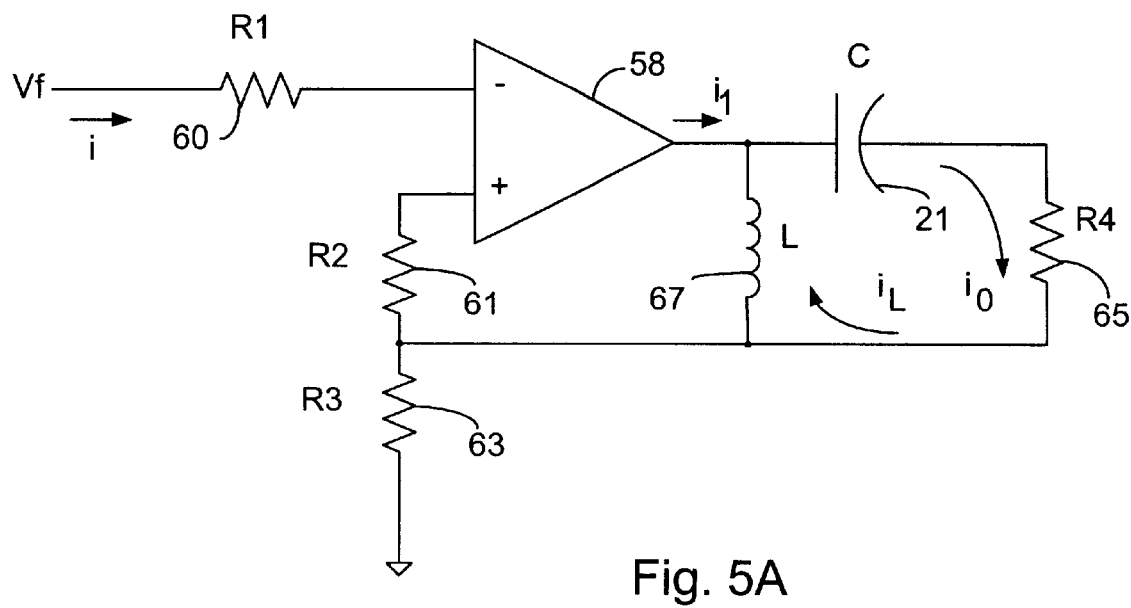
FIG. 5A is a functional schematic block diagram of the equivalent LC circuit formed by the transformer and the DC blocking capacitor of the analog front end circuit shown in FIG. 4.

In addition to amplification, the last two stages of the feedback circuit 37, stages 3 and 4, provide phase control. As stated above, the DC coupling capacitor 21 in combination with the transformer 17 creates a series resonant LC circuit. The forward gain stage of the analog front end circuit is shown in FIG. 5A and is comprised of the driver amplifier 58, equivalent resistances R1 60, R2 61, R3 63 and R4 65, the transformer equivalent inductance 67 and the DC blocking capacitance 21. Using the transfer function of the forward gain stage, the corresponding characteristic equation for the circuit is obtained as follows:

$$\frac{i_0}{i_i} = \frac{(S+0)^2}{\left(S - \frac{R_4}{2L} + \frac{\sqrt{\left(\frac{R_4}{L}\right)^2 - \frac{4}{LC}}}{2}\right)\left(S - \frac{R_4}{2L} - \frac{\sqrt{\left(\frac{R_4}{L}\right)^2 - \frac{4}{LC}}}{2}\right)} \quad \text{EQ. 1}$$

Figure 5B:
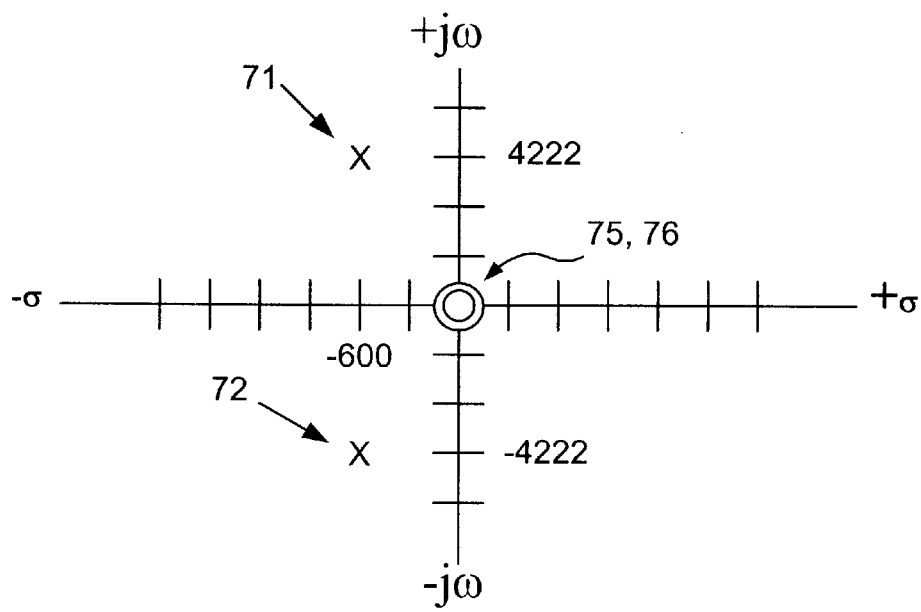
FIG. 5B is an S-domain frequency response plot corresponding to the circuit shown in FIG. 5A.

In the interest of brevity, the manner in which the characteristic equation is derived will not be described herein because persons skilled in the art will understand how this is accomplished. Assuming values of C=0.11 μf, L=0.5 H, and $R_4$=600 ohms, the S-domain frequency response plot is illustrated in FIG. 5B. Two poles 71 and 72 and two zeros 75 and 76 characterize the frequency response of the RLC circuit. The pole frequency in radians, $\omega_p$, corresponding to these values is 4,264 radians/sec and, in hertz, $f_p$, is 678 Hz. The quality factor corresponding to thse values, $Q_p$, is 3.55. However, it should be noted that the present invention is not limited to any specific values for the analog front end circuit 15, except that reasonable values must be used, as will be understood by those skilled in the art. The zeros are at the origin and the poles are at S=600±j4222.

Figure 6A:
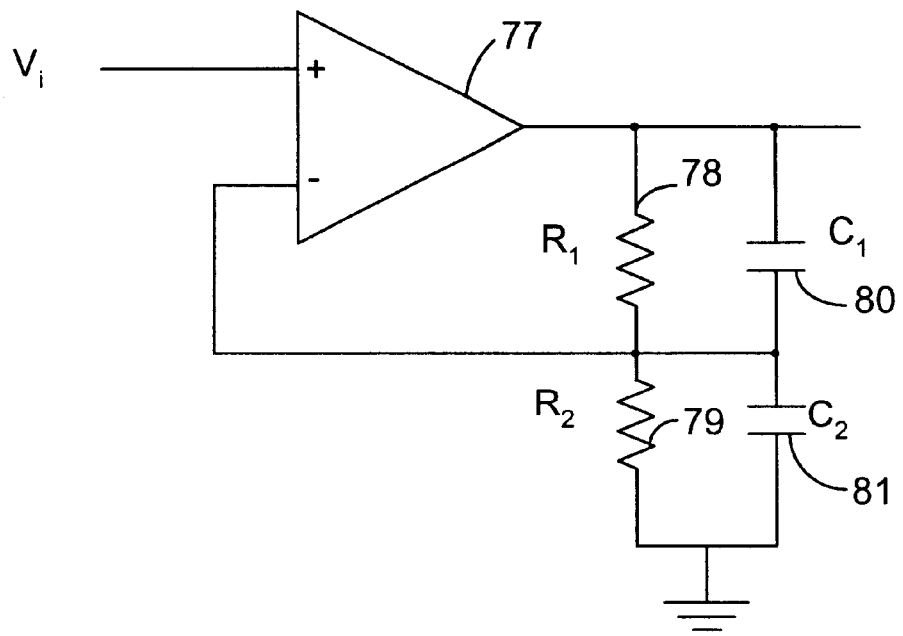
FIG. 6A is a functional schematic diagram of equivalent circuit for stages 49 and 51 of the analog front end circuit shown in FIG. 4.
Figure 6B:
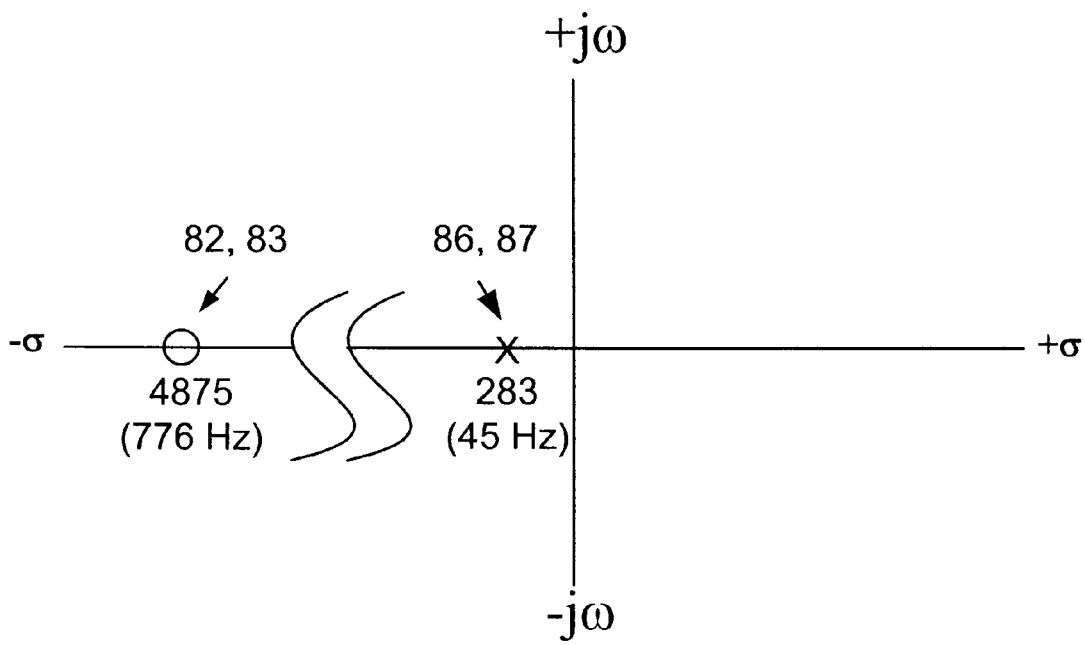
FIG. 6B is an S-domain frequency response plot corresponding to the circuit shown in FIG. 6A.

The frequency response of the RLC circuit produces a 180° phase change in the current signal being produced by the power driver amplifier 58. Stages 49 and 51 of the feedback circuit 37 are designed to have S-domain poles and zeros that substantially cancel the poles of the RLC circuit. Each of the amplification stages 49 and 51 has a frequency response characterized by a zero of approximately the same frequency as one of the poles of the RLC circuit, and a residual pole which is beyond unity-gain crossing and is benign, i.e., it has no effect due to the fact that the loop gain is less than 1. The equivalent circuit for stages 49 and 51 is shown in FIG. 6A and the corresponding S-domain zero-pole plot for both of the equivalent circuit is shown in FIG. 6B. The equivalent circuit comprises an amplifier 77, resistors $R_1$ 78 and $R_2$ 79, and capacitors $C_1$ 80 and $C_2$ 81. The corresponding characteristic equation for each of the equivalent circuit for amplification stages 49 and 51 is as follows:

$$\frac{V_o}{V_1} = \frac{C_1 + C_2}{C_1} \frac{S + \frac{1}{R_1 // R_2(C_1 + C_2)}}{S + \frac{1}{R_1 C_1}} \quad \text{EQ. 2}$$

which can be stated as:

$$\frac{V_o}{V_1} = K \frac{S + f_z}{S + f_p} \quad \text{EQ. 3}$$

where K=($C_1$+$C_2$)/$C_1$, $f_z$=1/(2π($R_1$//$R_2$)($C_1$+$C_2$)) and $f_p$=1/(2π$R_1$$C_1$). In this simple case, which is used herein for ease of illustration, the values of the resistors and capacitors of each of the amplification stages 49 and 51 are selected so that the frequencies of the zeros 82 and 83 of the associated amplification stage are the same as the pole frequencies of the poles of the forward path stage of the analog front end circuit of the present invention. As stated above, the poles 86 and 87 are beyond the low-frequency unity-gain crossing, and minimally affect the frequency response at approximatley 678 Hz. Preferably, the component values of the amplification stages 49 and 51 are selected to provide each of the amplification stages 49 and 51 with high gain in the frequecy band corresponding to the POTS voice band with the gain decreasing below zero for frequencies above approximately 15 KHz, thereby preventing the feedback circuit 37 from interfering with data transmission above 20 KHz. In accordance with the preferred embodiment, C1=27 nF, C2 is not used, R1=130 KΩ and R2=8060 Ω. However, those skilled in the art will understand that the present invention is not limited to these values or to any particular values for these components.

The feedback technique of the preferred embodiment forces zero current at the sense resistor 35 to provide the analog front end circuit with high impedance across the tip 27 and ring 28 terminals of the analog front end circuit, thus preventing an impedance null from being produced in the frequecny bands being used by the communications system, in particular, in the POTS band. However, it should be noted that the present invention is not limited to the embodiment discussed above for eliminating the impedance null. It will be understood by those skilled in the art that the object of the present invention of eliminating the impedance null can be achieved by using other techniques to force zero current at the sense resistor 35.

It should be noted that the present invention has been described with reference to the preferred embodiment and that the present invention is not limited to this embodiment. It will be understood by those skilled in the art that modifications may be made to the embodiment discussed above which are within the scope of the present invention.

What is claimed is:

1. An analog front end circuit for use in a data communications equipment (DCE) device, the analog front end circuit connecting the DCE device to a communications line, the analog front end circuit comprising:

a transformer comprising a line side and a DCE side;

a driver circuit for driving the communications line, the driver circuit having an input terminal coupled to the DCE device for receiving an input from the DCE device, the driver circuit having an output terminal coupled to the DCE side of the transformer for providing an output to the DCE side of the transformer, the output of the driver circuit being inductively coupled via the transformer from the DCE side to the line side of the transformer;

a DC blocking capacitor coupled to the line side of the transformer, the DC blocking capacitor and the transformer forming an LC circuit; and a current sensing circuit coupled to the DC blocking capacitor, the current sensing circuit comprising a feedback circuit, the current sensing circuit detecting current passing through a portion of the analog front end circuit and forcing the current passing through said portion of the analog front end circuit to approximately zero wherein the analog front end circuit is provided with a high impedance which prevents an impedance null from existing in frequency bands being used by the DCE device.

2. The analog front end circuit of claim 1, wherein the current sensing circuit comprises a sensing resistor for sensing the current passing through said portion of the analog front end circuit and wherein the feedback circuit is coupled to the sensing resistor, the feedback circuit generating a feedback signal which is input to the driver circuit, the feedback signal causing the driver circuit to force the current passing through said portion to approach approximately zero.

3. The analog front end circuit of claim 2, wherein the LC circuit has a frequency response characterized by a first pole at a particular frequency and wherein the feedback circuit comprises a phase control circuit having a frequency response characterized by a first zero at approximately said particular frequency.

4. The analog front end circuit of claim 3, wherein the frequency response of the LC circuit is futher characterized by a second pole at a second frequency and wherein the frequency response of the phase control circuit is further characterized by a second zero at approximately said second frequency.

5. The analog front end circuit of claim 4, wherein the phase control circuit comprises a first active filter circuit and a second active filter circuit, the first active filter circuit generating an output signal which is input to said second active filter circuit, wherein the first active filter circuit has a frequency response characterized by said first zero and the second active filter circuit has a frequency response characterized by a said second zero, the frequency responses of the first and second active filter circuits together comprising the frequency response of the phase control circuit.

6. The analog front end circuit of claim 5, wherein the first and second active filter circuits are active lowpass filter circuits.

7. The analog front end circuit of claim 5, wherein the first and second active filter circuits are active highpass filter circuits.

8. An analog front end circuit for use in a data communications equipment (DCE) device, the analog front end circuit connecting the DCE device to a communications line, the analog front end circuit comprising:
  a transformer comprising a line side and a DCE side;
  means for driving the communications line, the driving means having an input terminal coupled to the DCE device for receiving an input from the DCE device, the driving means having an output terminal coupled to the DCE side of the transformer for providing an output to the DCE side of the transformer, the output of the driving means being inductively coupled via the transformer from the DCE side to the line side of the transformer;
  a DC blocking capacitor coupled to the line side of the transformer, the DC blocking capacitor and the transformer forming an LC circuit; and
  means coupled to the DC blocking capacitor for sensing current passing through a portion of the analog front end circuit and for forcing the current passing through said portion of the analog front end circuit to approximately zero, said means for sensing current comprising a feedback circuit, wherein the analog front end circuit is provided with a high impedance which prevents an impedance null from existing in frequency bands being used by the DCE device.

9. The analog front end circuit of claim 8, wherein the sensing means comprises a sensing resistor for sensing the current passing through said portion of the analog front end circuit and wherein the the feedback circuit is coupled to the sensing resistor, the feedback circuit generating a feedback signal which is input to the driving means, the feedback signal causing the driving means to force the current passing through said portion to approach approximately zero.

10. The analog front end circuit of claim 9, wherein the LC circuit has a frequency response characterized by a first pole at a particular frequency and wherein the feedback circuit comprises a phase control circuit having a frequency response characterized by a first zero at approximately said particular frequency.

11. The analog front end circuit of claim 10, wherein the frequency response of the LC circuit is futher characterized by a second pole at a second frequency and wherein the frequency response of the phase control circuit is further characterized by a second zero at approximately said second frequency.

12. The analog front end circuit of claim 11, wherein the phase control circuit comprises a first active filter circuit and a second active filter circuit, the first active filter circuit generating an output signal which is input to said second active filter circuit, wherein the first active filter circuit has a frequency response characterized by said first zero and the second active filter circuit has a frequency response characterized by a said second zero, the frequency responses of the first and second active filter circuits together comprising the frequency response of the phase control circuit.

13. The analog front end circuit of claim 12, wherein the first and second active filter circuits are active lowpass filter circuits.

14. The analog front end circuit of claim 12, wherein the first and second active filter circuits are active highpass filter circuits.

15. A method for preventing an impedance null from occurring in frequency bands being used by an analog front end circuit of a data communications equipment (DCE) device, the analog front end circuit comprising a transformer for simultaneously coupling the DCE device to and isolating the DCE device from a communications line, the method comprising the steps of:
  sensing current passing through a line side of the analog front end circuit; and
  forcing the current passing through the line side to approximately zero whereby the analog front end circuit is provided with a high impedance and an impedance null is prevented from occurring in the frequency bands being used by the DCE device to communicate information over the communications line.

16. The method of claim 15, wherein the step of sensing comprises the step of utilizing a sensing circuit to sense the current passing through the line side of the analog front end circuit and for producing a feedback signal which is used to force the current passing through the line side to approximately zero.

17. The method of claim 16, wherein the analog front end circuit comprises a DC blocking capacitor, the DC blocking capacitor and the transformer forming an LC circuit having a frequency response characterized by a first pole at a first frequency, and wherein the sensing circuit comprises a phase control circuit having a frequency response characterized by a first zero at the first frequency, the first zero canceling the effect of the first pole.

18. The method of claim 17, wherein the frequency response of the LC circuit is further characterized by a second pole at a second frequency, and wherein the frequency response of the phase control circuit is further characterized by a second zero at the second frequency, the second zero canceling the effect of the first pole.

19. The method of claim 18, wherein the phase control circuit comprises a first active filter circuit and a second active filter circuit, the first active filter circuit having a frequency response characterized by the first zero and the second active filter circuit having a frequency response characterized by the second zero, the frequency responses of the first and second active filter circuits together forming the frequency response of the phase control circuit.

* * * * *